Patented Oct. 2, 1951

2,569,462

UNITED STATES PATENT OFFICE 2,569,462

EMULSION POLYMERIZATION OF UNSATURATED ORGANIC COMPOUNDS

Arthur E. Drake, Hockessin, Del., assignor to Hercules Powder Company, Wilmington, Del., a corporation of Delaware No Drawing. Application March 22, 1946,
Serial No. 656,521

10 Claims. (Cl. 260—82.3)

This invention relates to an improved process for the emulsion polymerization of unsaturated compounds and more particularly to an improved process of polymerizing vinyl, vinylidene, and vinylene compounds to provide improved synthetic rubberlike materials.

It is well known that unsaturated compounds, particularly those containing the vinyl group, may be advantageously polymerized in aqueous emulsion. Through use of the emulsion technique, synthetic rubberlike materials have been prepared by polymerizing diolefins, halogen derivatives of diolefins or other substituted diolefins, or by interpolymerizing diolefins with other compounds containing a vinyl group such as styrene, acrylic acid esters, and acrylic acid nitrile. Polymers such as polyvinyl halides, polyvinyl acetate, polystyrene, polymethyl methacrylate, and various other addition polymers also have been prepared by polymerization in aqueous emulsion. Soaps of fatty acids commonly have been used as emulsifying agents for polymerizations of this type.

These polymerizations usually have been carried out using a peroxide catalyst such as potassium persulfate, benzoyl peroxide, tert-butyl hydroperoxide, and the like. These catalysts have been quite useful in polymerizations of this type but have had one marked disadvantage in that they have necessitated too long a reaction period at moderate temperatures in order to obtain a reasonable yield of the polymeric materials. Furthermore, unreasonable lengths of time have been necessary to obtain optimum yields. The long reaction period usually associated with the use of these catalysts has been shortened by using increased temperatures during the polymerizations but the resulting polymers have suffered through use of such temperatures. Synthetic rubberlike materials, for example, have superior physical properties when they are prepared by low temperature polymerization. Until recently, however, it has been impossible from the standpoint of yield to combine the desirable features of low temperature polymerization and a relatively short reaction period. Furthermore, under the conditions generally used in synthetic rubber production, it has not been possible to effect a more optimum yield.

Now in accordance with this invention, it has been found that the polymerization of organic compounds containing the $CH_2=C<$ group and which are capable of being polymerized by a peroxide catalyst may be carried out to advantage in aqueous emulsion using a catalyst comprising a water-soluble persulfate and an aryl(dialkyl)methyl hydroperoxide.

In carrying out the process in accordance with this invention, the polymerization of vinyl, vinylidene, and vinylene compounds is effected in the usual manner utilizing the well-known emulsion technique with the exception that the catalyst utilized constitutes a combination of two different peroxide catalysts. The combination catalyst used in accordance with this invention permits polymerizations at lower temperatures and shorter reaction times, and results in higher yields.

The following examples are illustrative of the preparation of polymers by emulsion polymerization and the products thereof in accordance with this invention. All parts given in the examples represent parts by weight.

Example I

A glass polymerization vessel was charged with 41.7 parts of a 6% solution of the sodium salt of a dehydrogenated rosin (dehydroabietic acid, 53%; abietic acid, 0.0%; retene, 0.2%), this solution containing 2.5 parts of the sodium salt of the dehydrogenated rosin. To this soap solution were added 0.15 part potassium persulfate dissolved in 25 parts of water, 0.0335 part of $a,a$-dimethyl-p-isopropylbenzyl hydroperoxide, 24.88 parts of water, and 1.00 part of an activating salt solution. The 1.00 part of activating salt solution contained 0.00525 part of 78% ferric sulfate nonahydrate, 0.075 part of sodium pyrophosphate decahydrate, and 0.00019 part of cobaltous chloride hexahydrate dissolved in 0.92 part of distilled water. The resulting solution was frozen prior to the addition of 12.5 parts of styrene, 0.25 part of lauryl mercaptan, and 37.5 parts of butadiene-1,3 to the polymerization vessel. The mixture was agitated at 50° C. for 14 hours in the sealed polymerization vessel. The emulsion was then run into an open vessel containing 5 parts of a 2% solution of phenyl $\beta$-naphthylamine, stripped of the excess butadiene and the polymer precipitated by the addition of an excess of a saturated salt solution. The precipitated polymer was washed with water until alkali free, then with alcohol, and finally was dried in an oven. A yield of 8.44% polymer was obtained.

Example II

The procedure of Example I was duplicated with the exception that no activating salt solution was included and 0.028 part of α,α-dimethylbenzyl hydroperoxide was used in place of the α,α-dimethyl-p-isopropylbenzyl hydroperoxide utilized in Example I. A 77.0% yield of polymer was obtained.

*Example III*

The procedure of Example I was followed using 2.5 parts of a fatty acid soap (sodium salt of a mixture of palmitic and stearic acids) in place of the dehydrogenated rosin soap shown in Example I. The polymerization was carried out for 12 hours and a 92.0% yield of polymer was obtained.

*Example IV*

Twelve and one-half parts of acrylonitrile and 37.5 parts of butadiene-1,3 were copolymerized following the procedure of Example I with the exception that 0.1072 part of the hydroperoxide was utilized and the polymerization was carried out at 40° C. for 16 hours. A 99% yield of polymer was obtained.

*Example V*

Fifty parts of styrene were polymerized using the same conditions set forth in Example IV with the exception that no activating salt solution was used and 0.0833 part α,α-dimethyl benzyl hydroperoxide was used in place of the α,α-dimethyl-p-isopropylbenzyl hydroperoxide. A 100% yield of polymer was obtained.

*Example VI*

Fifty parts of methyl methacrylate were polymerized following the procedure of Example V with the exception that the polymerization was carried out for 5 hours over a temperature range of 82° C. to 98° C. The polymer yield was 79%.

*Example VII*

Utilizing 0.0171 part of α,α-dimethylbenzyl hydroperoxide in place of the α,α-dimethyl-p-isopropylbenzyl hydroperoxide, the reactants of Example I were charged into a glass polymerization vessel at a temperature of 25° C., the vessel sealed, and its contents frozen by cooling. The vessel then was opened and the free space thoroughly swept out with air, after which the vessel again was sealed and the reaction mixture agitated at 40° C. for 25 hours. Upon working up the reaction mixture as in Example I, an 83.0% yield of polymer was obtained.

*Example VIII*

Twelve and one-half parts of acrylonitrile and 37.5 parts of butadiene-1,3 were copolymerized in the presence of 0.0841 part of α,α-dimethylbenzyl hydroperoxide using the procedure of the preceding example. A yield of 100% polymer was obtained.

Although the examples have shown the use of potassium persulfate in conjunction with an aryl(dialkyl)methyl hydroperoxide as the catalyst in accordance with this invention, other water-soluble persulfates are operable. Sodium persulfate, ammonium persulfate, etc., are exemplary. The concentration of the water-soluble persulfate may be varied from about 2% to about 9% based on the amount of solid emulsifying agent used. The preferable amount of persulfate on this basis, however, is about 6%.

The aryl(dialkyl)methyl hydroperoxides used in the process of this invention may be prepared by the oxidation of alkyl-substituted aromatic organic compounds having the structural formula

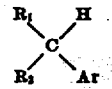

in which $R_1$ and $R_2$ represent alkyl groups and Ar represents a substituent selected from the group consisting of aryl and substituted aryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° C. and about 95° C. in the presence of an aqueous alkali. The concentration of the aqueous alkali may be between about 1% and about 35%, although it is preferable to use concentrations of about 2% to about 8%. Vigorous agitation is desirable during the oxidation reaction.

As illustrative of the alkyl-substituted aromatic organic compounds which may be oxidized, p-cymene, cumene, and diisopropylbenzene may be mentioned. These compounds lead to α,α-dimethyl-p-methylbenzyl, α,α-dimethylbenzyl, and α,α-dimethyl-p-isopropylbenzyl hydroperoxides, respectively. These compounds also may be named as aryl(dialkyl)methyl hydroperoxides, for example, α,α-dimethylbenzyl hydroperoxide may be designated as phenyl(dimethyl)methyl hydroperoxide. The aryl and substituted-aryl groups need not be derived from benzene, as is the case in the aforementioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, tertiary butyl, and the like, the same alkyl groups also being representative of $R_1$ and $R_2$ in the structural formula. $R_1$ and $R_2$ may be either the same or different.

The amount of hydroperoxide which may be used in accordance with this invention may be between about 5% and about 50% of the active oxygen supplied by the persulfate, the amount of active oxygen in the persulfate being one atom of oxygen per molecule of the persulfate. The preferable amount of hydroperoxide upon this basis, however, is between about 14% and about 20%, and in most cases this amount will effect the desired result.

The process of this invention may be carried out using various emulsifying agents, such as fatty acid soaps; the water-soluble salts of hydrogenated and dehydrogenated rosins or the pure acids thereof, such as dihydroabietic, tetrahydroabietic, and dehydroabietic acids; the water-soluble salts of the amines derived from hydrogenated and dehydrogenated rosins or the pure acids thereof, for example, the acetates of dihydroabietylamine, tetrahydroabietylamine, and dehydroabietylamine; and any other emulsifying agent well known in the art. The rosin amines mentioned may be prepared by converting the acids in the rosin material to the corresponding nitriles by treatment with ammonia under dehydrating conditions, and then reducing the nitriles to the amines by catalytic hydrogenation.

Most of the examples, however, have shown the use of a salt of dehydrogenated rosin as emulsifying agent. Such salts are prepared by neutralization of a dehydrogenated rosin with an alkali metal compound basic in characteristics, such as the hydroxides and carbonates of sodium and potassium. The dehydrogenated rosins are prepared by the dehydrogenation or disproportionation of natural rosin or a rosin material containing a substantial amount of a natural rosin. The dehydrogenation or disproportionation reaction is carried out by contacting the rosin or rosin material at an elevated temperature with an active hydrogenation catalyst in the absence of added hydrogen. Catalysts such as palladium, platinum, nickel and copper chromite are suitable and may be supported on a carrier such as granular alumina, fibrous asbestos or activated charcoal. The catalytic treatment may be conducted either by a batchwise or continuous procedure. The rosin may be agitated, for example, with about 5% to about 20% by weight of a palladium catalyst supported on activated carbon (1% to 2% palladium) at about 150° C. to about 300° C. for about 1 hour to about 5 hours. In the continuous process the molten rosin flows over the supported palladium catalyst at a temperature within the range of about 225° C. to about 300° C. to provide a contact time of about ¼ hour to about 1 hour.

It often is advantageous to refine the whole rosin prior to its dehydrogenation or disproportionation and the same is true as applied to the whole dehydrogenated or disproportionated product. Prior to its dehydrogenation or disproportionation the rosin may be refined by crystallization, by means of a selective solvent such as furfural or phenol, or by an absorbent earth such as fuller's earth. The dehydrogenated or disproportionated rosin product may be refined by distillation, heat-treatment, alkali extraction, precipitation, etc. It is desirable that the dehydrogenated or disproportionated rosin or derivative thereof contain at least 45% and preferably at least 50% dehydroabietic acid. The dehydrogenated or disproportionated rosin also should contain less than 1% abietic acid.

As shown by the examples various activating salts may be added to the polymerization reaction mixture. The activating salts shown by the examples; namely, ferric sulfate, sodium pyrophosphate and cobaltous chloride, constitute a redox system, which is so called because of its property of catalyzing oxidation-reduction reactions. Such systems usually comprise a salt of a heavy metal such as iron, cobalt or nickel associated with a complex-forming compound such as a pyrophosphate. The redox system, therefore, comprises essentially a heavy metal complex wherein the metal is united to another element through coordinate covalences rather than primary valences. Amounts between about 0.1% and about 1% by weight of the heavy metal complexes based on the monomers present are generally suitable. The salts of some heavy metals such as iron are sufficiently active so that the salt of only one metal need be present, but usually the redox system contains at least two heavy metal salts, and each individual salt may be present in the redox system in amounts between about 0.0003% and about 0.01% by weight based on the monomers employed.

Compounds which may be advantageously polymerized in aqueous emulsion in accordance with this invention include the conjugated butadiene hydrocarbons, butadiene and its derivatives such as isoprene, dimethyl butadiene, chloroprene, etc., and other compounds containing the vinyl group such as styrene, acrylonitrile, etc. Through utilization of the persulfate-hydroperoxide catalysts, particularly advantageous results have been obtained in the preparation of copolymers of butadiene and styrene or acrylonitrile, isoprene and styrene or acrylonitrile and other rubberlike copolymers as well as in the preparation of polymers such as polystyrene, polymethyl methacrylate, and the various other addition polymers which may be prepared by the emulsion technique.

The polymerizations may be carried out under conditions well known in the art for emulsion polymerization; e. g., concentration of reactants, temperature, pressure, etc. The temperature of the polymerization reaction may vary from about 20° C. to about 100° C., and the concentration of the emulsifying agent in the aqueous phase may be varied from about 1% to about 5%, preferably from about 2% to about 3%. During the polymerizations it is desirable that a modifier, such as lauryl mercaptan, be present in the reaction mixture.

As illustrated in Examples VII and VIII, the addition of oxygen, in the form of air in these examples, has a beneficial effect on the polymer yields obtained when using a catalyst comprising a water-soluble persulfate and an aryl(dialkyl)methyl hydroperoxide. In these examples the amount of oxygen was 0.05 part per 100 parts of monomers, but an amount of oxygen up to about 0.4 part per 100 parts of monomers is beneficial.

The combination persulfate-hydroperoxide catalysts of this invention are advantageous in that the time required to obtain a given yield of a polymer is reduced, as compared to previous processes, thereby increasing the capacity of a polymerization vessel and decreasing the cost of the polymer. Furthermore, through practice of this invention increased yields are obtained by polymerizations carried out at lower temperatures for periods of time comparable to those which have previously been used by the art. The use of the catalysts of this invention in the preparation of rubberlike polymers does not materially change the properties of such polymers as they have been recognized before. Use of the catalysts also is very applicable to polymerizations carried out with soaps of dehydrogenated rosin as emulsifying agents. It is known that dehydrogenated rosin soaps impart desirable physical properties to rubberlike polymers, such as those derived from the copolymerization of butadiene and styrene, but the use of these soaps has been somewhat disadvantageous due to the fact that there existed a rather long period of slow reaction during the initial phases of the polymerization. The combination catalysts of this invention permit the use of dehydrogenated rosin soaps to obtain in comparable lengths of time polymer yields which are equivalent to those obtained with fatty acid soaps using persulfate catalysts.

What I claim and desire to protect by Letters Patent is:

1. The process which comprises polymerizing an organic compound containing the $CH_2=C<$ group and which is capable of being polymerized by a peroxide catalyst, in aqueous emulsion in the presence of a catalyst comprising a water-soluble persulfate and an aryl(dialkyl)methyl hydroperoxide in which each alkyl group contains not more than 4 carbon atoms, said hydroperoxide being in an amount providing active oxygen equivalent to between about 5% and about 50% of the active oxygen provided by the persulfate.

2. The process which comprises polymerizing an organic compound containing the $CH_2=C<$ group and which is capable of being polymerized by a peroxide catalyst, in aqueous emulsion in the presence of a catalyst comprising a water-soluble persulfate and an aryl(dialkyl)methyl hydroperoxide in which each alkyl group contains not more than 4 carbon atoms, and an activator comprising a water-soluble pyrophosphate and water-soluble salts of two heavy metals selected from the group consisting of iron, cobalt, and nickel, said hydroperoxide being in an amount providing active oxygen equivalent to between about 5% and about 50% of the active oxygen provided by the persulfate.

3. The process which comprises polymerizing an organic compound containing the $CH_2=C<$ group and which is capable of being polymerized by a peroxide catalyst, in aqueous emulsion in the presence of a catalyst comprising a water-soluble persulfate and an aryl(dialkyl)methyl hydroperoxide in which each alkyl group contains not more than 4 carbon atoms, and an activator comprising a water-soluble pyrophosphate and water-soluble salts of iron and cobalt, said hydroperoxide being in an amount providing active oxygen equivalent to between about 5% and about 50% of the active oxygen provided by the persulfate.

4. The process which comprises polymerizing an organic compound containing the $CH_2=C<$ group and which is capable of being polymerized by a peroxide catalyst, in aqueous emulsion in the presence of a catalyst comprising a water-soluble persulfate and an aryl(dialkyl)methyl hydroperoxide in which each alkyl group contains not more than 4 carbon atoms, and an activator comprising sodium pyrophosphate, ferric sulfate, and cobaltous chloride, said hydroperoxide being in an amount providing active oxygen equivalent to between about 5% and about 50% of the active oxygen provided by the persulfate.

5. The process which comprises polymerizing an organic compound containing the $CH_2=C<$ group and which is capable of being polymerized by a peroxide catalyst, in aqueous emulsion in the presence of a catalyst comprising a water-soluble persulfate and $\alpha,\alpha$-dimethyl-p-methylbenzyl hydroperoxide, said hydroperoxide being in an amount providing active oxygen equivalent to between about 5% and about 50% of the active oxygen provided by the persulfate.

6. The process which comprises polymerizing an organic compound containing the $CH_2=C<$ group and which is capable of being polymerized by a peroxide catalyst, in aqueous emulsion in the presence of a catalyst comprising a water-soluble persulfate and $\alpha,\alpha$-dimethylbenzyl hydroperoxide, said hydroperoxide being in an amount providing active oxygen equivalent to between about 5% and about 50% of the active oxygen provided by the persulfate.

7. The process which comprises polymerizing an organic compound containing the $CH_2=C<$ group and which is capable of being polymerized by a peroxide catalyst, in aqueous emulsion in the presence of a catalyst comprising a water-soluble persulfate and $\alpha,\alpha$-dimethyl-p-isopropylbenzyl hydroperoxide, said hydroperoxide being in an amount providing active oxygen equivalent to between about 5% and about 50% of the active oxygen provided by the persulfate.

8. The process which comprises polymerizing butadiene-1,3 in aqueous emulsion in the presence of a catalyst comprising potassium persulfate and $\alpha,\alpha$-dimethyl-p-methylbenzyl hydroperoxide, said hydroperoxide being in an amount providing active oxygen equivalent to between about 5% and about 50% of the active oxygen provided by the persulfate.

9. The process which comprises copolymerizing butadiene-1,3 and styrene in aqueous emulsion in the presence of a catalyst comprising potassium persulfate and $\alpha,\alpha$-dimethyl-p-isopropylbenzyl hydroperoxide, said hydroperoxide being in an amount providing active oxygen equivalent to between about 5% and about 50% of the active oxygen provided by the persulfate.

10. The process which comprises copolymerizing butadiene-1,3 and acrylonitrile in aqueous emulsion in the presence of a catalyst comprising potassium persulfate and $\alpha,\alpha$-dimethylbenzyl hydroperoxide, said hydroperoxide being in an amount providing active oxygen equivalent to between about 5% and about 50% of the active oxygen provided by the persulfate.

ARTHUR E. DRAKE.

REFERENCES CITED

The following references are of record in the file of this patent:

UNITED STATES PATENTS

| Number | Name | Date |
| --- | --- | --- |
| 2,366,328 | Fryling | Jan. 2, 1945 |
| 2,367,805 | Semple | Jan. 23, 1945 |
| 2,384,574 | Stewart et al. | Sept. 11, 1945 |
| 2,388,477 | Fryling | Nov. 6, 1945 |
| 2,388,514 | Zwicker et al. | Nov. 6, 1945 |
| 2,395,523 | Vaughn et al. | Feb. 26, 1946 |
| 2,400,041 | Dickey | May 7, 1946 |
| 2,460,038 | Serniuk | Jan. 25, 1949 |

Certificate of Correction

Patent No. 2,569,462                                                   October 2, 1951

ARTHUR E. DRAKE

It is hereby certified that error appears in the printed specification of the above numbered patent requiring correction as follows:

Column 2, line 50, for "8.44%" read *84.4%*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*